US009374761B2

United States Patent
Keller et al.

(10) Patent No.: US 9,374,761 B2
(45) Date of Patent: Jun. 21, 2016

(54) ROUTING TERMINATING CALL TO USER EQUIPMENT VIA CONTROL NODES

(75) Inventors: Ralf Keller, Wurselen (DE); Fredrik Alriksson, Sundbyberg (SE); Fredrik Lindholm, Stockholm (SE); Karl-Peter Ranke, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 14/116,107

(22) PCT Filed: Apr. 13, 2012

(86) PCT No.: PCT/EP2012/001612
§ 371 (c)(1),
(2), (4) Date: Nov. 6, 2013

(87) PCT Pub. No.: WO2012/152360
PCT Pub. Date: Nov. 15, 2012

(65) Prior Publication Data
US 2014/0073333 A1  Mar. 13, 2014

Related U.S. Application Data

(60) Provisional application No. 61/483,203, filed on May 6, 2011.

(51) Int. Cl.
*H04W 40/00* (2009.01)
*H04L 12/66* (2006.01)
(Continued)

(52) U.S. Cl.
CPC .............. *H04W 40/02* (2013.01); *H04L 45/306* (2013.01); *H04W 76/02* (2013.01); *H04W 68/00* (2013.01); *H04W 92/24* (2013.01)

(58) Field of Classification Search
CPC . H04W 40/004; H04L 65/1069; H04L 76/02; H04L 12/66
USPC .......................................... 455/445; 370/352
See application file for complete search history.

(56) References Cited

U.S. PATENT DOCUMENTS

| 7,881,734 B2 * | 2/2011 | Rathnasabapathy . H04Q 3/0025 455/433 |
| 2010/0158213 A1 * | 6/2010 | Mikan et al. ................ 379/88.14 |

(Continued)

FOREIGN PATENT DOCUMENTS

| EP | 2676415 A1 | 12/2013 |
| WO | 2007062674 A1 | 6/2007 |
| WO | 2012110110 A1 | 8/2012 |

OTHER PUBLICATIONS

3rd Generation Partnership Project; Technical Specification Group Services and System Aspects; Voice Call Continuity between CS and IMS Study (Release 7), 3GPP Draft; 3GPP TS 23.806 V1.3.0, 2005, 178 pages.
Zte et al. "CS Fallback with ISR" 3GPP TSG SA WG2 Meeting #65, TD S2-083280, 3rd Generation Partnership Project (3GPP), 2008, 5 pages.

(Continued)

*Primary Examiner* — Thomas Lett
(74) *Attorney, Agent, or Firm* — Rothwell, Figg, Ernst & Manbeck, P.C.

(57) ABSTRACT

A method for routing a terminating call to a user equipment via a first control node for controlling the call, wherein the user equipment is attached to a second control node which is adapted to provide routing information. The method comprises determining, by the second control node, if the user equipment is attached to the second control node over a third control node, wherein the attachment over the third control node indicates that call control shall be performed by a specific service domain. Based on the determining, the provided routing information is selected by the second control node, wherein the routing information indicates to the first control node if the further call establishment to the user equipment is controlled either by the second control node or by the third control node. The call is then routed, by the first control node, according to the selected routing information.

13 Claims, 4 Drawing Sheets

(51) Int. Cl.
*H04W 40/02* (2009.01)
*H04W 76/02* (2009.01)
*H04L 12/725* (2013.01)
*H04W 68/00* (2009.01)
*H04W 92/24* (2009.01)

(56) References Cited

U.S. PATENT DOCUMENTS

2010/0195616 A1* 8/2010 Vikberg et al. ............... 370/331
2010/0323695 A1* 12/2010 Kallio et al. ............... 455/435.2
2010/0329244 A1 12/2010 Buckley et al.
2012/0083265 A1* 4/2012 Noldus .................. H04W 8/08 455/426.1
2013/0308632 A1* 11/2013 Keller .................. H04W 76/02 370/352

OTHER PUBLICATIONS

3rd Generation Partnership Project; Technical Specification Group Services and System Aspects; IP Multimedia Subsystem (IMS) centralized services; Stage 2 (Release 10), 3GPP Draft; 3GPP TS 23.292 V10.3.0, 2011, 107 pages.

3rd Generation Partnership Project; Technical Specification Group Services and System Aspects; Architectural requirements (Release 10), 3GPP Standard; 3GPP TS 23.221 V10.0.0, 2011, 48 pages.

3rd Generation Partnership Project; Technical Specification Group Services and System Aspects; Circuit Switched (CS) fallback in Evolved Packet System (EPS); Stage 2 (Release 10), 3GPP Draft; 3GPP TS 23.272 V10.3.0, 2011, 78 pages.

Communication dated Dec. 4, 2014, issued in European Patent Application No. 12717183.3, 3 pages.

* cited by examiner

ROUTING TERMINATING CALL TO USER EQUIPMENT VIA CONTROL NODES

CROSS REFERENCE TO RELATED APPLICATION(S)

This application is a 35 U.S.C. §371 National Phase Entry Application from PCT/EP2012/001612, filed Apr. 13, 2012, designating the United States, and also claims the benefit of U.S. Provisional Application No. 61/483,203, filed May 6, 2011. The disclosures of both applications are incorporated herein in their entirety by reference.

TECHNICAL FIELD

The invention relates to a method for routing a terminating call to a user equipment via a control node for controlling the call.

The invention also relates to control nodes for executing such a method.

Beyond this, the invention relates to a communication system for routing a terminating call to a user equipment.

Moreover, the invention relates to a data carrier comprising software.

BACKGROUND

The 3GPP ($3^{rd}$ Generation Partnership Project) specified IMS (IP Multi-media Subsystem) network is an access-independent and standard-based IP connectivity and service control architecture that enables various types of multimedia services to end-users using common Internet-based protocols.

As outlined in 3GPP TS (Technical Specification by the $3^{rd}$ Generation Partnership Project) 23.292, T-ADS (Terminating-Access Domain Selection) shall be aware of currently used access (PS, Packet Switched, or CS, Circuit Switched) to forward terminating calls to a user. T-ADS shall also check for IMS voice over PS support and RAT (Radio Access Type) type in the serving MME (Mobile Management Entity) and/or SGSN (Serving GPRS Support Node). T-ADS shall furthermore, for all terminating calls for registered contacts (if registered via PS), query the current serving nodes (via HSS, Home Subscriber Server) for IMS voice over PS support and RAT type.

T-ADS obtains the aforementioned information (PS support and RAT) via a reference point Sh from the HSS. HSS obtains the information via reference points S6a to an EPC (Evolved Packet Core) node MME or via Gr/S6d to SGSN.

Service Domain Selection (SDS) is a concept used to decide on the serving domain for an originating call, for instance CS or IMS, as described in 3GPP TS 23.221 as well as when a call arrives at terminating GMSC (Gateway Mobile Switching Center) whether CS or IMS network should serve the call as described in 3GPP TS 23.221.

3GPP TS 23.292 describes a solution for a static domain selection, i.e., originated and terminated calls are always routed to the IMS.

SDS and T-ADS may also be considered in combination.

With introduction of IMS Centralized Services (ICS), user's services are migrated from the CS network to IMS. IMS will be the network serving the user as a single service engine meaning that originating and terminating calls need to visit IMS.

It is assumed that ICS is introduced aligned with start of VoLTE (Voice over LTE, i.e. Long Term Evolution) where MMTel/IMS is the recommended service engine.

SUMMARY

It is an object of the invention to improve the routing of calls in a communication system with a plurality of service domains.

In order to achieve the object defined above, a method for routing a terminating call to a user equipment via a first control node for controlling the call is provided, wherein the user equipment is attached to a second control node which is adapted to provide routing information. The method comprises determining, by the second control node, if the user equipment is attached to the second control node over a third control node, wherein the attachment over the third control node indicates that call control shall be performed by a specific service domain. Based on the determination, the provided routing information is selected by the second control node, wherein the routing information indicates to the first control node if the further call establishment to the user equipment is controlled either by the second or by the third control node. The call is routed by the first control node according to the selected routing information.

According to another embodiment of the invention, a second control node is provided, particularly for contributing to executing a method having the above mentioned features. The second control node comprises an interface to provide routing information, and a processing system adapted to determine the association of a user equipment to a third control node and for selecting the routing information based on the determination.

According to another embodiment of the invention, a third control node is provided, particularly for contributing to executing a method having the above mentioned features. The third control node comprises an interface to provide information of a user equipment attached to the third control node to a second control node. The third control node further comprises a processing system adapted to determine the association of the user equipment to the third control node and capabilities of the user equipment to receive a call under the control of the third control node, and whether said user equipment is using or is adapted to use a specific service domain.

According to still another embodiment of the invention, a communication system for routing a terminating call to a user equipment is provided. The communication system comprises a first control node via which the terminating call is routable to the user equipment for controlling the call. The communication system further comprises a second control node to which the user equipment is attached and which is adapted to provide routing information. The second control node is adapted to determine if the user equipment is attached to the second control node over a third control node, wherein the attachment over the third control node indicates that call control shall be performed by a specific service domain. The second control node is further adapted to select, based on the determination, the provided routing information. The routing information indicates to the first control node if the further call establishment to the user equipment is controlled either by the second or by the third control node. The first control node is adapted to route the call according to the selected routing information.

An embodiment of the invention may be embodied in software, for instance on a data carrier, adapted to execute the above method when loaded into at least one processor of at least one control node. For instance, part of the software may be loaded into a processor of the above-mentioned second control node, whereas another part of the software may be loaded into a processor of the above-mentioned third control node. These parts of the software and the processors may cooperate to carry out the above mentioned method in combination.

Particularly, one or more program elements (for instance a software routine, in source code or in executable code) may be provided, which, when being executed by one or more processors (such as a microprocessor or a CPU), is or are adapted to control or carry out the method having the above mentioned features.

It is noted that the numbering of the nodes (such as first control node, second control node or third control node) does not necessarily imply that nodes having smaller numbers must be necessarily present as well when a node with a higher number is mentioned. In contrast to this, the numbering is performed for the mere sake to obtain a consistent and logic numbering of nodes in the claims and/or in the description.

Exemplary embodiments of the invention allow that terminating calls are flexibly routed via specific paths under the control of a selectable one of control nodes, thereby reducing delay and capacity requirements of a call management system. Depending on an actually applicable service domain, call establishment to user equipment can be controlled by a correspondingly chosen control node.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

Figure 1:
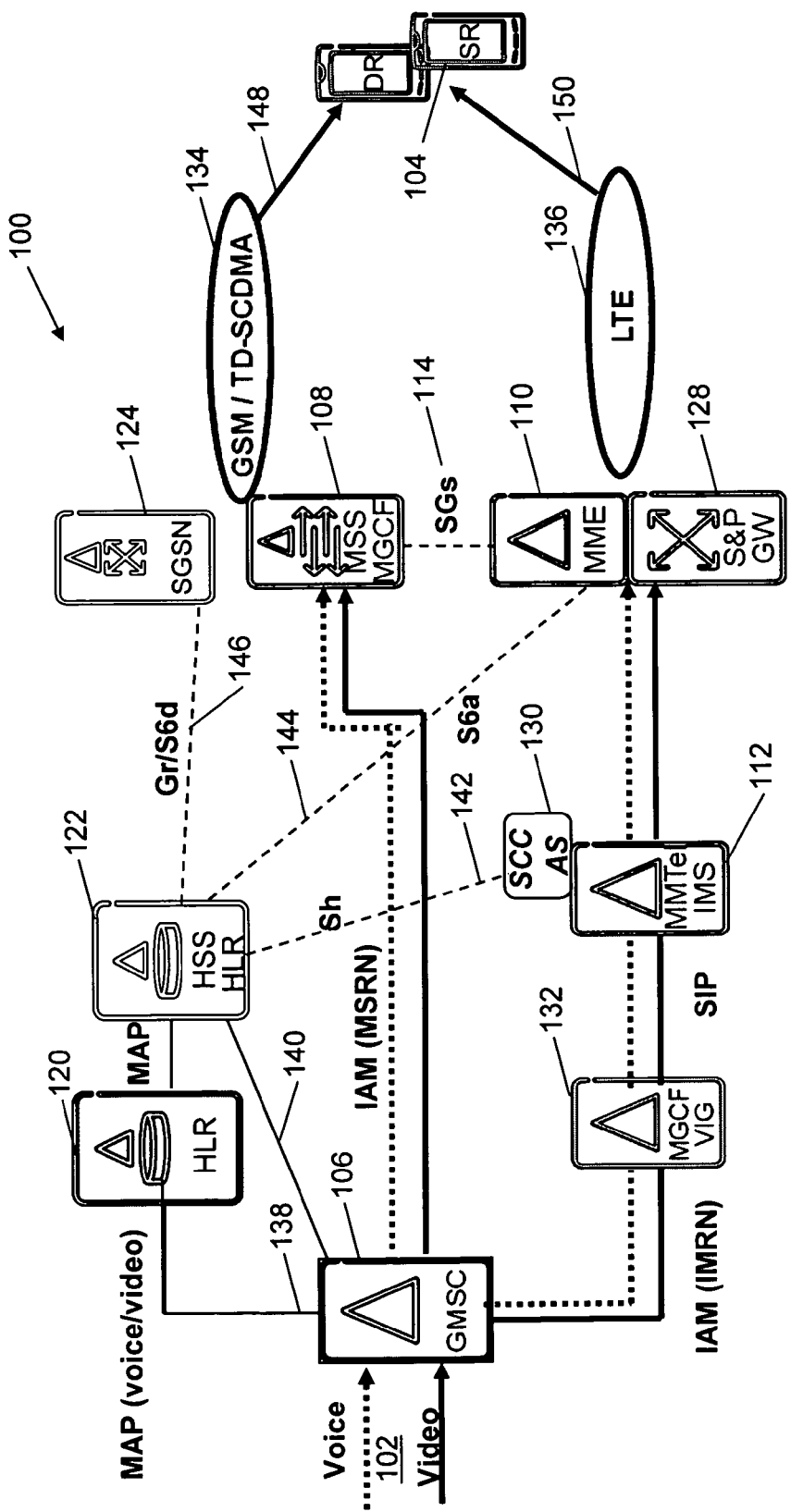
FIG. 1 illustrates a communication network coupling a first control node, a second control node, a third control node, and a user equipment in accordance with an exemplary embodiment of the invention.

In the context of this application, the term "node" may particularly denote any communication device, for instance a transmitter/receiver device (transceiver), which allows for an exchange of communication messages and/or data packets with a communication partner over a communication system or network. Such a node may be a computer (such as a server or a client). It may be a wired or wireless communication device. A node may have processing resources, storage resources, and message transmitting/receiving resources. A control node may be a node which fulfils control tasks.

In the context of this application, the term "user equipment" (UE) may particularly denote a mobile communication device, a portable communication device, a mobile terminal, a mobile phone, a data card, a Personal Digital Assistant, a personal computer, a laptop, etc. Hence, portable or stationary communication devices can be operated in accordance with the disclosed architecture of exemplary embodiments.

An exemplary embodiment of the invention relates to a method for routing a terminating call to a user equipment via a first control node for controlling the call. The user equipment is attached to a second control node which is adapted to provide routing information.

The second control node determines if the user equipment is attached to the second control node over a third control node. The attachment over the third control node indicates that call control shall be performed by a specific service domain, for instance by an IP Multimedia Subsystem.

Based on the determination, the second control node selects the provided routing information. The routing information indicates to the first control node if the further call establishment to the user equipment is controlled either by the second or by the third control node. The first control node can thus route the call accordingly.

In this way, the proposed method can reduce delay and capacity requirements of a call management system such as an IMS system.

For example in early steps of IMS and VoLTE deployments, both VoLTE and CS access co-exists due to lack of full LTE coverage. The users will be served by CS and LTE however still IMS will be used as service engine. For these scenarios, calls originated in CS access need conventionally to be routed to IMS as well as for cases when terminating user is on CS access, terminated calls will need to visit IMS network to execute terminating services for the subscriber. If the majority of calls in the network are between users over CS access, routing of calls always to IMS might add some delay and requires sufficient capacity in the IMS which is not desirable. This can be improved by the proposed method.

As already mentioned, the routing information may indicate to the first control node if the further call establishment to the user equipment is controlled by the second or by the third control node. Particularly, the routing information may indicate only where to route the call. It is for instance not essential for the first control node (such as a GMSC), whether this is CS or IMS. More particularly, from the perspective of the first control node, it may be sufficient that the routing information indicates where to route the call.

In the following, further exemplary embodiments of the above method will be explained. However, these embodiments also apply to the second control node, the third control node, the communication system and the data carrier.

It should be noted that the call itself needs not to be established via the control nodes because they may only control the establishment of a call leg, for instance they may be involved in bearer establishment for the call only while the payload of the call is transported by other nodes. Hence, the processing capabilities and the resource requirements of the control nodes may be moderate.

More specifically, an embodiment of the invention may be implemented in an environment which uses SDS in MSC (Mobile Switching Center) for IMS Voice users. Exemplary embodiments of the invention allow that originated calls on a CS network are not forced into IMS and terminating calls reaching operators GMSC are not routed to IMS unless the user is operating on E-UTRAN (evolved UMTS Terrestrial Radio Access Network, wherein UMTS means Universal Mobile Telecommunications System) and is an IMS Voice user.

Such a concept may result in an improvement or even optimization of call routing and reduction of call set-up delays in early stages of VoLTE deployment. There is no need to perform SDS in HLR (Home Location Register)/HSS (Home Subscriber Server). Exemplary embodiments of the invention can also be easily implemented in existing MSCs because functionality related to the SGs interface can be reused for the purpose of embodiments of the invention.

In an embodiment, the attachment over the third control node indicates, e.g. to the second control node, that the call control shall be performed by an IP Multimedia Subsystem.

In an embodiment the attachment over the third control node is indicated by an association of the user equipment to an interface between the second and the third control node, for example an SGs interface or any other appropriate kind of interface. Such an interface analysis is a very simple criterion for determining such an attachment. SGs is an interface between MME and MSC server. It can be used for Mobility Management (MM) and paging procedures.

In a further embodiment, the routing information can be provided via one or via a plurality of subscriber registers from the second control node to the first control node. However, in alternative embodiments the routing information may be stored elsewhere, for instance in a database assigned to the second control node.

In a still further embodiment, the determination can comprise a check, e.g. based on information stored in the communication system, if the user equipment is adapted to receive a call under the control of the third control node so as to determine whether the third control node is indeed capable of controlling the routing of such a call.

Embodiments of the invention can also be implemented in a second control node. Such a second control node comprises an interface to provide routing information. The second control node comprises also a processing system adapted to determine the association of a user equipment to a third control node and for selecting the routing information based on the determination.

In the following, further exemplary embodiments of the second control node will be explained. However, these embodiment also apply to the method, the third control node, the communication system and the data carrier.

In particular, the second control node can provide a routing information which indicates that the user equipment is associated with the third control node. Therefore, the second control node may be the entity which defined which routing information is used for routing the call.

The second control node can be adapted to any embodiment of the method as described above.

A third control node may also be adapted to exemplary embodiments of the invention. The third control node comprises an interface to provide information of a user equipment attached to the third control node to the second control node. The third control node comprises also a processing system adapted to determine the association of the user equipment to the third control node and capabilities of the user equipment to receive a call under the control of the third control node, and whether said user equipment is using or adapted to use a specific service domain.

In the following, further exemplary embodiments of the third control node will be explained. However, these embodiments also apply to the method, the second control node, the communication system and the data carrier.

The specific service domain can be an IP Multimedia Subsystem.

The third control node can be adapted to any embodiment of the method as described above.

Exemplary embodiments are described below with specific reference to a 3GPP communication system with an IMS network. In this case it implements a dual service engine, wherein for an equal sub-set of supplementary services both CS and IMS network may be provisioned with necessary data and may be synchronized.

The terminal, when operating on LTE, may use SMSoSGs (SMS, Short Message Service, over SGs) or CSFB (Circuit Switched Fall Back). In the following, SMSoSGs is used to exemplify.

FIG. 1 illustrates a communication network 100 in accordance with an exemplary embodiment of the invention. The communication network 100 couples a first control node 106 (in this embodiment a GMSC), a second control node 108 (in this embodiment an MSS MGCF, Mobile Switching Centre Server/Media Gateway Control Function), a third control node 110 (in this embodiment an MME), and a user equipment 104 (in this embodiment a SR, Single Radio User Equipment, alternatively a DR, Double Radio User Equipment).

In this communication network 100, a method for routing a terminating call 102 (such as a video or voice call) to the mobile user equipment 104 via the first control node 106 is carried out for controlling this call 102. The user equipment 104 is attached to the second control node 108 which is, in turn, adapted to provide routing information.

The method comprises determining, by the second control node 108, if the user equipment 104 is attached to the second control node 108 over the third control node 110. The attachment over the third control node 110 indicates that call control shall be performed by a specific service domain 112, in this example IMS. Based on the determination, the second control node 108 selects the provided routing information for correspondingly routing the call 102 over an appropriate path of the communication network 100. The routing information indicates to the first control node 106 if the further call establishment to the user equipment 104 is controlled by the second control node 108 or by the third control node 110. According to the method, the call 102 is then routed by the first control node 106 according to the selected routing information. The attachment over the third control node 110 indicates that the call control shall be performed by an IP Multimedia Subsystem (see reference numeral 112).

It should be said that the call 102 needs not necessarily be established by the control nodes 108, 110 but may be established via another node of the communication system 100. In such an embodiment, the control nodes 108, 110 only control the establishment of the call leg. It is further possible to involve the control nodes 108, 110 in bearer establishment for the call 102 only, whereas a payload of the call 102 may be transported by one or more other nodes of the communication system 100.

It is possible that the above-mentioned attachment is indicated over the third control node 110 by an association of the user equipment 104 to an interface 114 between the second control node 108 and the third control node 110. This interface 114 between the second control node 108 and the third control node 110 is an SGs interface in the shown embodiment.

The method of operating the communication system 100, particularly of managing transmission of the call 102, further comprises providing the routing information from the second control node 108 to the first control node 106 via a subscriber register. The routing data may hence be stored in such a subscriber register.

The determination comprises a check if the user equipment 102 is adapted to receive a call 102 under the control of the third control node 110.

Further components are provided as well in the communication system 100 as well, i.e. a HLR (Home Location Register) 120 and a HSS/HLR (Home Subscriber Server/Home Location Register) 122 communicatively coupled therewith. HSS/HLR 122 is further coupled to SGSN 124. HSS/HLR 122 is further coupled to an SCC AS (Service Centralization and Continuity Application Server) 130. GMSC or first control node 106 is further coupled to MGCF VIG (Media Gateway Control Function Video Gateway) 132, which is in turn coupled to S&P GW (S&P Gateway) 128. Various networks contribute to the communication within the communication system 100, i.e. a GSM (Global System for Mobile Communications)/TD-SCDMA (Time Division Synchronous Code Division Multiple Access) network 134 and an LTE network 136. Various interfaces or communication channels 138, 140, 142, 144, 146, 148, 150 are shown as well.

For terminating calls 102 reaching GMSC or first control node 106, the HLR will request a roaming number from the MSC Server or second control node 108 serving the subscriber operating the user equipment 104. The MSC Server or second control node 108 can then make a decision whether to return an MSRN (Mobile Station Roaming Number), and hence the call 102 will be routed to the MSC Server or second control node 108, or an IMRN (IMS Routing number, which can simply be a prefixed B number), and hence the call 102 will be routed to the IMS 112. This is depicted in FIG. 1. FIG. 1 shows the routing of a voice call (dotted bold line) and a video call (continuous bold line) over the first control node 106, in the example a GMSC, either under control of the second control node (MSS MGCF) 108 or under control of the third control node (MME) 110. The third control node 110 or the second control node 108 is indicated in the Initial Address Message IAM by an IMRN or an MSRN. The second control node 108 selects either the IMRN or the MSRN in response to a request from the HSS or HLR 122. FIG. 1 indicates also different reference points between involved nodes. Radio networks for connecting mobile user equipment 104 to the control nodes 108, 110 are indicated by ellipses (see reference numerals 134, 136) and may comprise further elements which are well-known to a skilled person, in particular radio base stations for wireless communication.

In more detail, the second control node 108 or MSC (Mobile Switching Centre, depicted in FIG. 1 as a Media Gateway Control Function MGCF implemented in a Mobile Soft Switch MSS) knows whether a particular subscriber is attached via SGs interface 114 or via another interface, for instance an A-, Iu-, or Gs-interface.

Generally, only a Single Radio UE (SR UE) is attached as user equipment 104 via SGs interface 114, not a Dual Radio (DR) UE (Dual Radio UE do not use LTE and CSFB (Circuit Switch Fallback)/SMSoSGs for voice or SMS, Short Message Service). DR UE have both an LTE and a GSM receiver so that they may simultaneously transmit data over LTE and voice over GSM. This allows operators to omit the SGs interface 114 for simplification although it is also possible in this case to have this interface.

The establishment and release of SGs associations over SGs interface 114 may have different causes:

An SGs association is established from MME or third control node 110 if SR UE or user equipment 104 performs EPC (Evolved Packet Core)/IMSI (International Mobile Subscriber Identity) attach or combined TA/LA (Tracking Area/Location Area) Update, for CSFB or for SMS only, as specified in 3GPP TS 23.272

Figure 2:
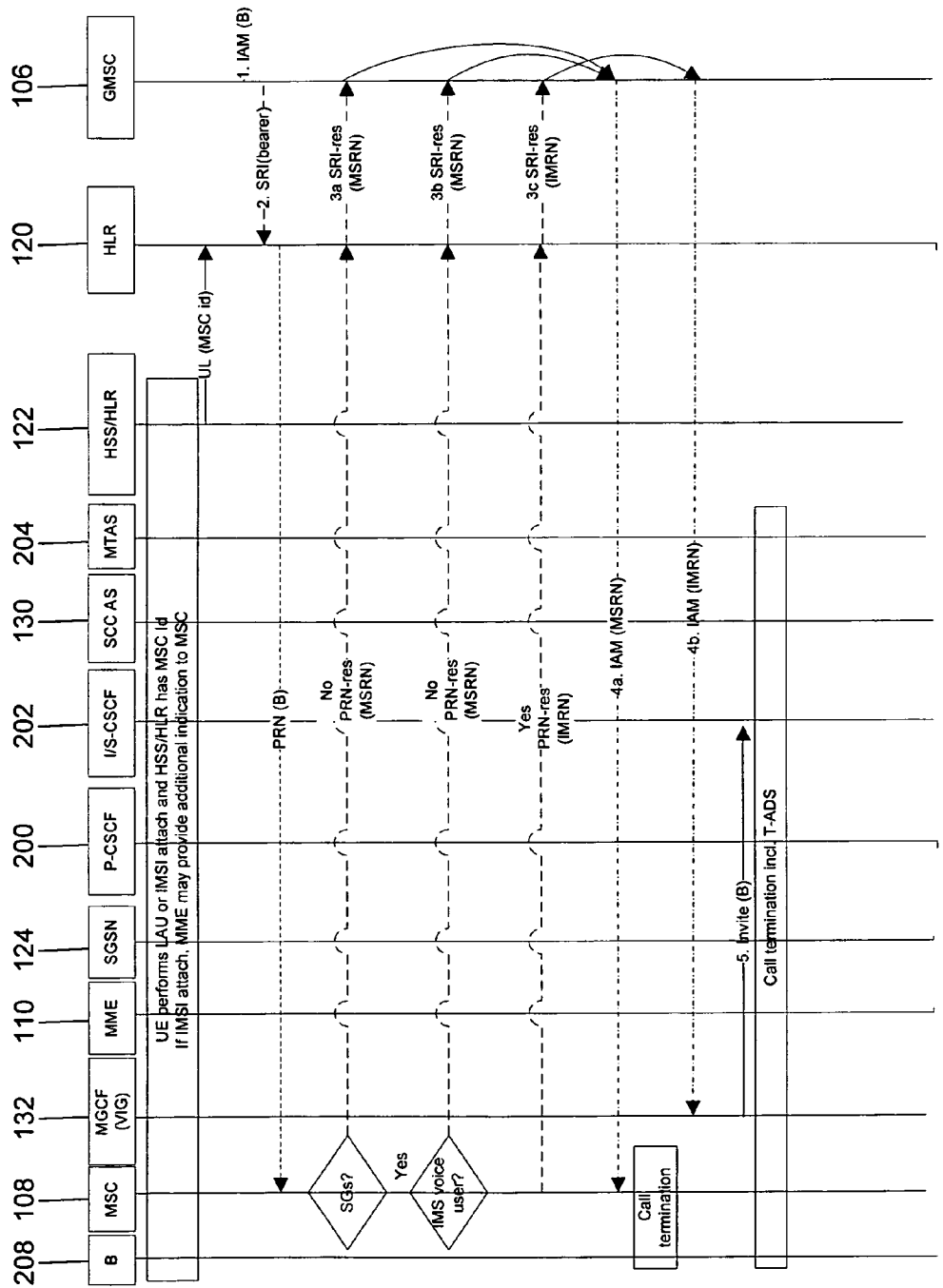
FIG. 2 illustrates a workflow for operating a communication network in accordance with an exemplary embodiment of the invention.

An SGs association is released, for instance, if:
  the user equipment 104 performs LAU (Location Area Update) via A-/Iu-/Gs-interface to the MSC or second control node 108 having the SGs association for this subscriber
  the user equipment 104 performs LAU via A-/Iu-/Gs-interface to another MSC and the MSC or second control node 108 having the SGs association for this subscriber will receive a MAP (Mobile Application Part) Cancel Location message The MSC or second control node 108 can perform additional checks to determine whether the subscriber is an IMS voice user, for instance:
  whether SRVCC (Single Radio Voice Call Continuity) is enabled for this subscriber by checking STN (Session Transfer Number)-SR or other "IMS Voice" indication via SGs (needs to be provided by MME or third control node 110 to the MSC or second control node 108 over the SGs interface 114, for instance at establishment of the SGs association)
  whether the subscriber is an ICS user by checking the ICS indication (not shown in the call flow of FIG. 2; the ICS flag needs to be provisioned in HLR as specified in 3GPP TS 23.292).

Such additional checks are not mandatory for any embodiment but may improve the method in certain scenarios, for instance if terminals without IMS voice capability are associated to the MSC or second control node 108 via an SGs interface 114. For example, it may be possible that some operators have such terminals with such a property while other operators do not so that this option may for instance improve the handling of roaming terminals.

When the GMSC (Gateway MSC) or first control node 106 receives a terminating call 102, it will send a message MAP (Mobile Application Part) Send Routing Info (SRI) to the HLR 120, and the HLR 120 will send MAP Provide Roaming Number message (PRN) to the MSC or second control node 108 where the subscriber is registered, for instance as in prior art systems. In an embodiment of the invention, this MSC or second control node 108 returns for a terminating call 102:
  an MSRN if the subscriber has no SGs association, or if one of the other conditions above are not fulfilled
  an IMRN if the subscriber has an SGs association established and all other conditions above are fulfilled The IMRN can be a prefixed B number, i.e. a specific prefix of the B number may identify it as an IMRN. Other IMRN options are possible and may be selected depending on different administration aspects. For example, a specific range of numbers may be defined as IMRN.

Still referring to FIG. 1, HSS/HLR 122 performs update location to HLR 120 and provides MSC ID of serving MSC or second control node 108. Serving MSC or second control node 108 has a logic to determine whether to route call to CS access or to IMS 112. So on receipt of PRN the MSC or second control node 108 acts as follows:
  if SGs is established, provide prefixed B-number (IMRN)
  else provide MSRN
  can take other input into account as well, if present
  terminating SMS are handled by MSC via A/Iu or via SGs
  In an embodiment, a specific logic in MSC needs only to be supported by MSC supporting SGs (if user equipment 104 is attached to other MSC then always terminate in CS). It is possible to use SMSoSGs.

FIG. 2 below shows a call flow according to the above-described method which may be used in the communication system 100 as shown in FIG. 1.

Further network components are shown as well in the call flow, i.e. P-CSCF (Proxy-Call Session Control Function) 200, I/S-CSCF (Interrogation-/Serving-Call Session Control Function) 202, MTAS (Mobile terminating access service) 204, and a node B 208.

The GMSC or first control node 106 receives an IAM 1 for a subscriber B and sends an SRI 2 to the HLR 120. If the communication system 100 comprises both a legacy HLR 120 and an HSS/HLR 122 adapted to IMS, the legacy HLR 120 may have obtained the identification of the terminating MSC or second control node 108 in a prior procedure as indicated.

In FIG. 2, different roaming numbers are sent in the alternative options for the response message 3. Depending on the routing information provided, the IAM in step 4 is sent to different target nodes and accordingly different terminating call legs are set up as indicated in FIG. 1.

The call flow of FIG. 2 shows a "HSS/HLR 122" and a "HLR 120" which can be an "old HLR" for cases when the HSS/HLR 122 is introduced when deploying LTE/EPC but the old HLR 120 is kept for legacy call cases. The terminology new/old refers here to either an HLR as used in CS systems or an HSS adapted to interworking with an IMS system. However, the call flow is also applicable to cases where only a "HSS/HLR 122" is present (i.e. the old HLR has been replaced). The use of both "new HSS/HLR" and an "old HLR" and the update location to the old HLR may be done as in conventional systems.

Figure 3:
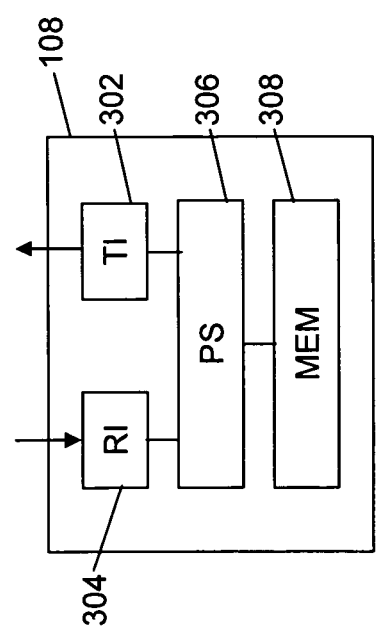
FIG. 3 illustrates the constitution of the second control node of FIG. 1.

FIG. 3 illustrates constitution of the second control node 108 of FIG. 1. The second control node 108 comprises a transmitter interface 302 for sending data to a communicatively coupled node and a receiver interface 304 for receiving data from a communicatively coupled node. For instance, it is possible to provide routing information at transmitter interface 302. A processing system 306 (such as a microprocessor or a central processing unit) is adapted to determine the association of the user equipment 104 to the third control node 110 and for selecting the routing information based on the determination. The second control node 108 is further adapted to provide a routing information which indicates that the user equipment 104 is associated with the third control node 110. The second control node 108 further comprises a memory 308 accessible by the processing system 306. Data, control parameter and/or software code for operating the second control node 108 may be stored permanently or temporarily on memory 308. Further components (not shown in FIG. 3) may form part of the second control node 108 as well.

Figure 4:
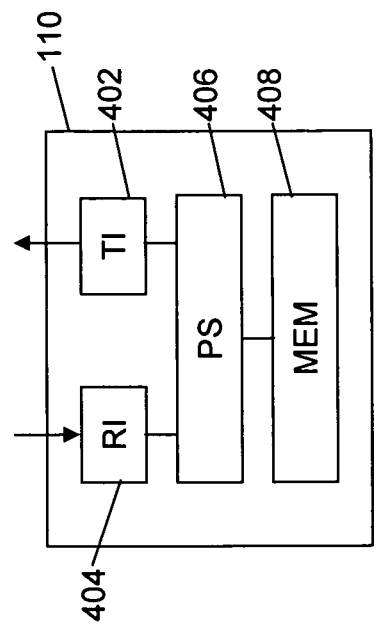
FIG. 4 illustrates the constitution of the third control node of FIG. 1.

FIG. 4 illustrates constitution of the third control node 110 of FIG. 1. The third control node 110 comprises a transmitter interface 402 for sending data to a communicatively coupled node and a receiver interface 404 for receiving data from a communicatively coupled node. For instance, it is possible to provide information of the user equipment 104 attached to the third control node 110 to a second control node 108 via transmitter interface 402. A processing system 406 (such as a microprocessor or a central processing unit) adapted to determine the association of the user equipment 104 to the third control node 110 and capabilities of the user equipment 104 to receive a call 102 under the control of the third control node 110, and whether said user equipment 104 is using or is adapted to use a specific service domain 112 such as an IP Multimedia Subsystem. Data, control parameter and/or software code for operating the third control node 110 may be stored permanently or temporarily on memory 408. Further components (not shown in FIG. 4) may form part of the third control node 110 as well.

Figure 5:
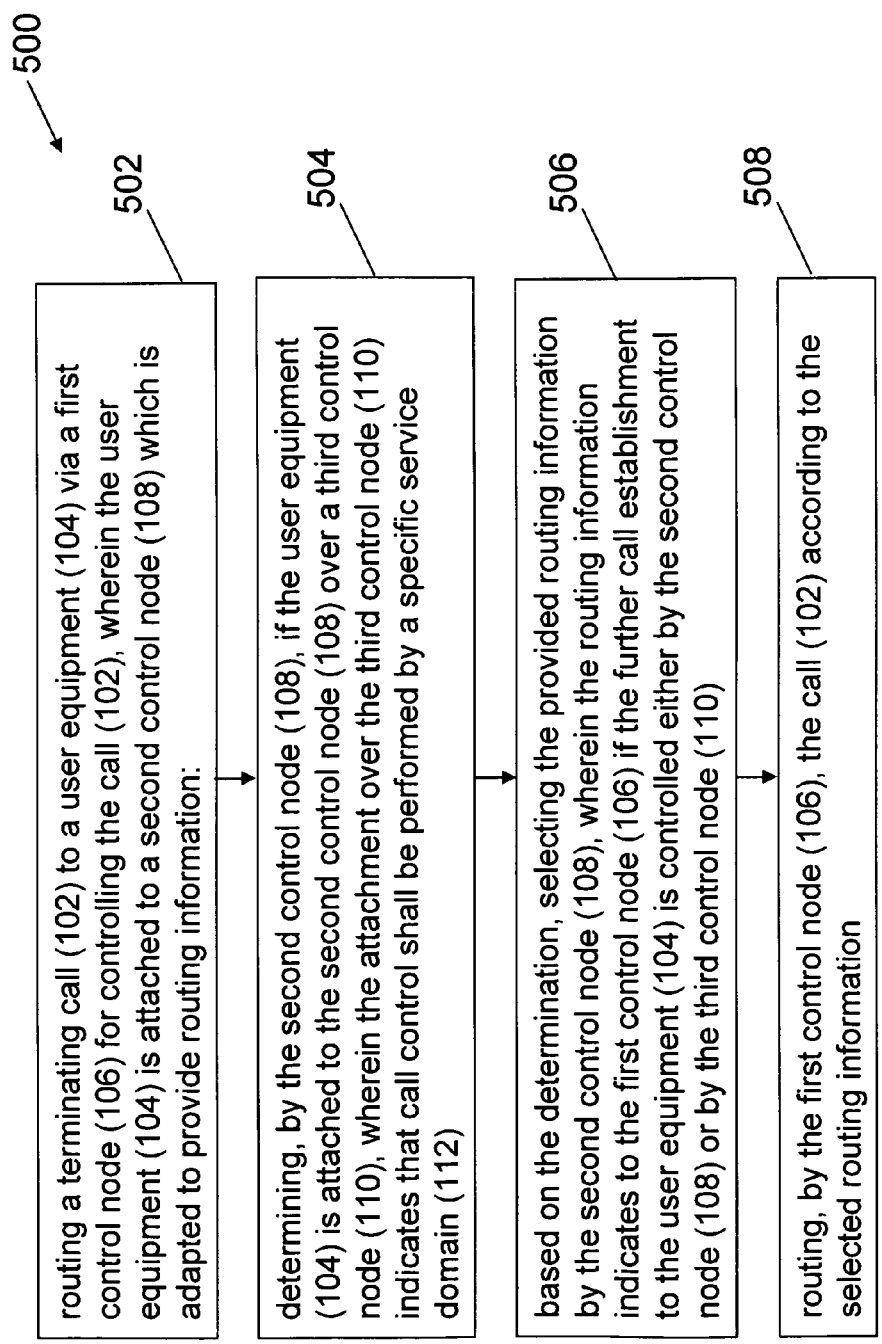
FIG. 5 illustrates a flowchart of a method of operating a communication network according to an exemplary embodiment of the invention.

FIG. 5 illustrates a flowchart of a method 500 of routing a terminating call 102 to a user equipment 104 via a first control node 106 for controlling the call 102 according to an exemplary embodiment of the invention. The user equipment 104 is attached to a second control node 108 which is adapted to provide routing information (see reference numeral 502).

As can be taken from a block 504, the method 500 comprises determining, by the second control node 108, if the user equipment 104 is attached to the second control node 108 over a third control node 110, wherein the attachment over the third control node 110 indicates that call control shall be performed by a specific service domain 112.

As can be taken from a block 506, based on the determination, the provided routing information is selected 506 by the second control node 108. The routing information indicates to the first control node 106 if the further call establishment to the user equipment 104 is controlled either by the second control node 108 or by the third control node 110.

As can be taken from a block 508, the call is then routed, by the first control node 106, according to the selected routing information.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A method for routing a terminating call in a communication system with a plurality of service domains to a user equipment via a first control node for controlling the terminating call, wherein the user equipment is attached to a second control node which is adapted to provide routing information to the first control node for the terminating call, the method comprising:
   determining, by the second control node, if the user equipment is attached to the second control node over a third control node, wherein the attachment over the third control node indicates that call control shall be performed by a specific service domain of the plurality of service domains;
   based on the determining, selecting the provided routing information by the second control node, wherein the routing information indicates to the first control node if the further call establishment to the user equipment is controlled either by the second control node or by the third control node; and
   routing, by the first control node, the terminating call according to the selected routing information.

2. The method according to claim 1, wherein the attachment over the third control node indicates that the call control shall be performed by an IP Multimedia Subsystem.

3. The method according to claim 1, wherein the method further comprises establishing the call via at least one other node being different from the first, second, and third control nodes, and wherein the first, second, and third control nodes only control the establishment of a call leg.

4. The method according to claim 3, wherein the method further comprises using the first, second, and third control nodes in bearer establishment for the call only, while transporting payload of the call by at least one other node.

5. The method according to claim 1, wherein the method further comprises indicating the attachment over the third control node by an association of the user equipment to an interface between the second control node and the third control node.

6. The method according to claim 5, wherein the interface between the second control node and the third control node is an SGs interface.

7. The method according to claim 1, wherein the method further comprises providing the routing information from the second control node to the first control node via one or via a plurality of subscriber registers.

8. The method according to claim 1, wherein the determining comprises a check if the user equipment is adapted to receive a call under the control of the third control node.

9. A second control node, comprising:
   an interface to provide routing information for a terminating call to a first control node;

a processing system adapted to
determine if a user equipment is attached over a third control node, wherein the attachment over the third control node indicates a call control shall be performed by a specific service domain of a plurality of service domains; and
based on the determining, select a provided routing information, wherein the routing information indicates to the first control node if a further call establishment to the user equipment is controlled either by the second control node or by the third control node.

10. The second control node according to claim 9, adapted to provide the selected routing information.

11. A communication system for routing a terminating call to a user equipment, the communication system comprising:
a first control node via which the terminating call is routable to the user equipment for controlling the call;
a second control node to which the user equipment is attached and which is adapted to provide routing information to the first control node for the terminating call;
wherein the second control node is adapted to determine if the user equipment is attached to the second control node over a third control node, wherein the attachment over the third control node indicates that call control shall be performed by a specific service domain of the plurality of service domains;
wherein the second control node is adapted to select, based on the determination, the provided routing information, wherein the routing information indicates to the first control node if the further call establishment to the user equipment is controlled either by the second control node or by the third control node; and
wherein the first control node is adapted to route the call according to the selected routing information.

12. The communication system according to claim 11, wherein the system comprises the third control node and, wherein the third control node is adapted to:
provide information of the user equipment attached to the third control node to the second control node, and
determine the association of the user equipment to the third control node and capabilities of the user equipment to receive the call under the control of the third control node, and whether said user equipment is using or is adapted to use the specific service domain of the plurality of service domains.

13. A non-transitory computer readable medium comprising software, adapted to execute the method according to claim 1, when loaded into one or more processors of one or more control nodes.

* * * * *